US011029180B2

(12) United States Patent
Craig

(10) Patent No.: US 11,029,180 B2
(45) Date of Patent: Jun. 8, 2021

(54) FLUID METERING COMPONENT AND SPRAYING APPARATUSES THEREOF

(71) Applicant: Corey Craig, Auburn, AL (US)

(72) Inventor: Corey Craig, Auburn, AL (US)

(*) Notice: Subject to any disclaimer, the term of this patent is extended or adjusted under 35 U.S.C. 154(b) by 0 days.

(21) Appl. No.: 16/655,072

(22) Filed: Oct. 16, 2019

(65) Prior Publication Data

US 2020/0116535 A1    Apr. 16, 2020

Related U.S. Application Data

(60) Provisional application No. 62/746,112, filed on Oct. 16, 2018.

(51) Int. Cl.
| | | |
|---|---|---|
| *G01F 1/00* | (2006.01) | |
| *G01F 1/115* | (2006.01) | |
| *B05B 12/00* | (2018.01) | |
| *H04W 84/18* | (2009.01) | |
| *G01K 7/22* | (2006.01) | |
| *H04B 1/3827* | (2015.01) | |
| *G01S 19/13* | (2010.01) | |

(52) U.S. Cl.
CPC .......... *G01F 1/1155* (2013.01); *B05B 12/006* (2013.01); *G01K 7/22* (2013.01); *G01S 19/13* (2013.01); *H04B 1/3833* (2013.01); *H04W 84/18* (2013.01)

(58) Field of Classification Search
CPC .................................. G01F 1/11; B05B 12/00
See application file for complete search history.

(56) References Cited

U.S. PATENT DOCUMENTS

| | | | | |
|---|---|---|---|---|
| 7,396,327 | B2* | 7/2008 | Morello | A61M 1/1086 |
| | | | | 415/900 |
| 7,603,915 | B2* | 10/2009 | Spivak | G01F 1/78 |
| | | | | 73/861.352 |
| 8,994,551 | B2* | 3/2015 | Pitchford | G01F 3/12 |
| | | | | 340/870.02 |
| 10,060,774 | B1* | 8/2018 | Bartlett | G01F 15/00 |
| 10,060,775 | B2* | 8/2018 | Ruiz Cortez | H02K 7/1823 |
| 10,384,204 | B2* | 8/2019 | McFarland | G02B 27/141 |
| 2013/0333764 | A1* | 12/2013 | Wright | E03C 1/02 |
| | | | | 137/1 |
| 2018/0216978 | A1* | 8/2018 | Dames | G01F 15/18 |
| 2018/0348030 | A1* | 12/2018 | Chen | G01F 5/00 |
| 2019/0178697 | A1* | 6/2019 | Yoon | H02J 7/0047 |
| 2020/0338282 | A1* | 10/2020 | Trzecieski | A24F 40/46 |

* cited by examiner

*Primary Examiner* — Max H Noori
(74) *Attorney, Agent, or Firm* — Patterson Intellectual Property Law, P.C.; Alex H. Huffstutter

(57) ABSTRACT

A fluid metering device including a housing, an isolated fluid conduit, a metering assembly, an electronics assembly, and a power assembly. An electronic device can be wirelessly connected to the metering device so as to quantify the fluid that is passing through the isolated fluid conduit. Portable spraying apparatuses are also disclosed and can include the fluid metering device. In example embodiments, other data can be captured and/or calculated such as location of spray, type of fluid sprayed, images of the intended-to-be-sprayed subject, and/or other information pertinent as desired. In some example embodiments, the electronic device D in combination with the fluid metering device can predict the chances of volatilization of the fluid based on specific environmental conditions and the fluid temperature.

20 Claims, 10 Drawing Sheets

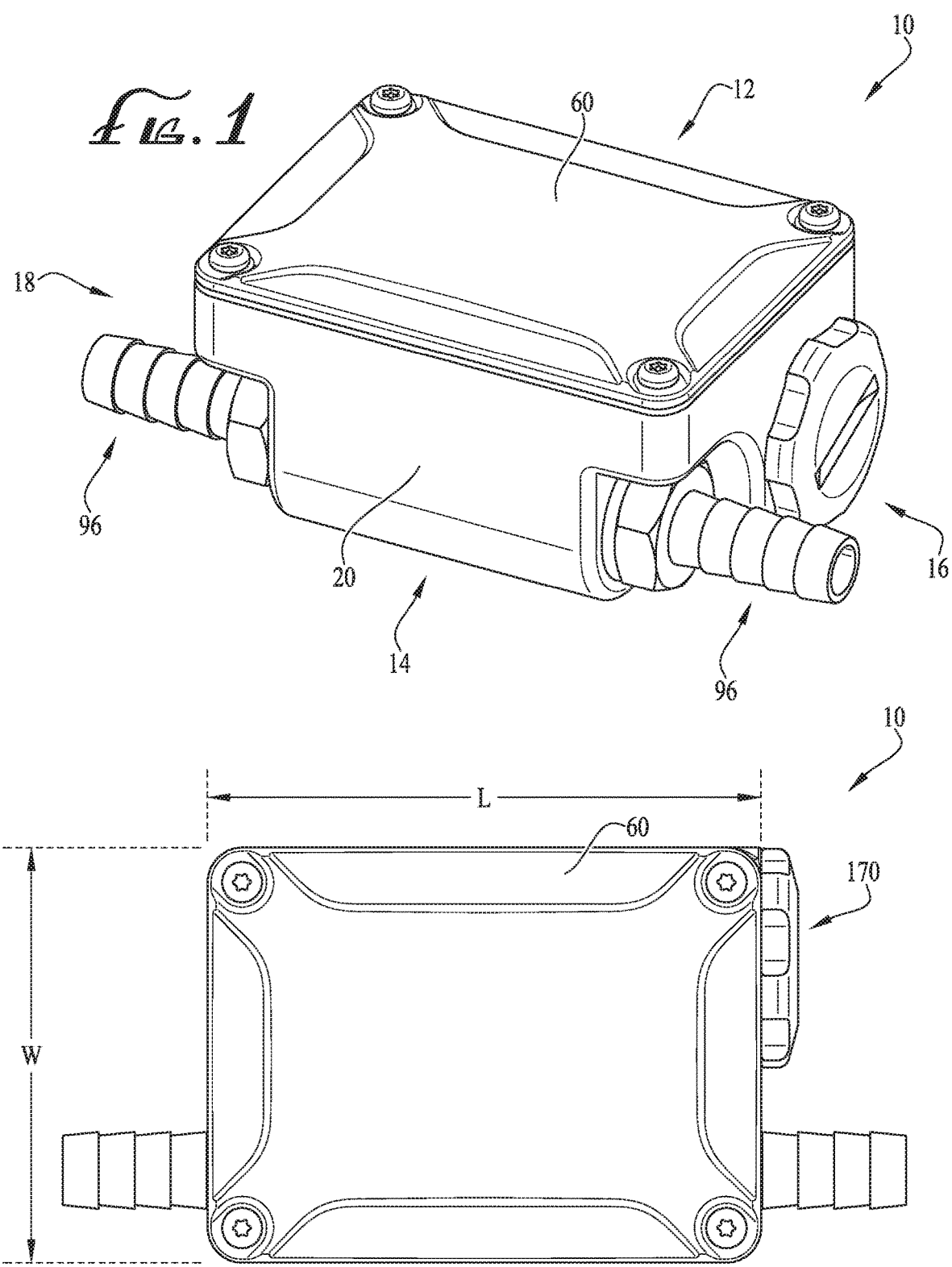

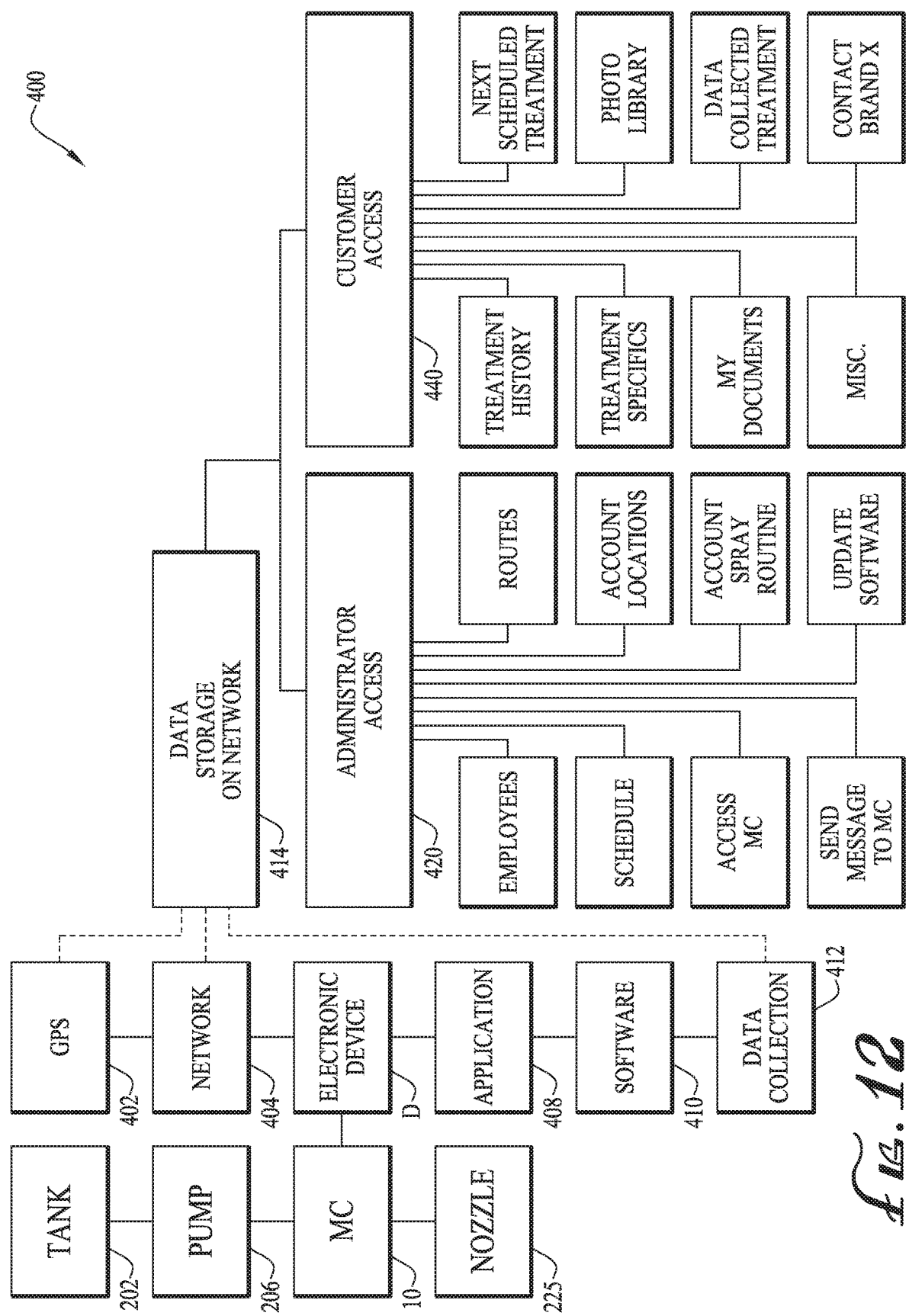

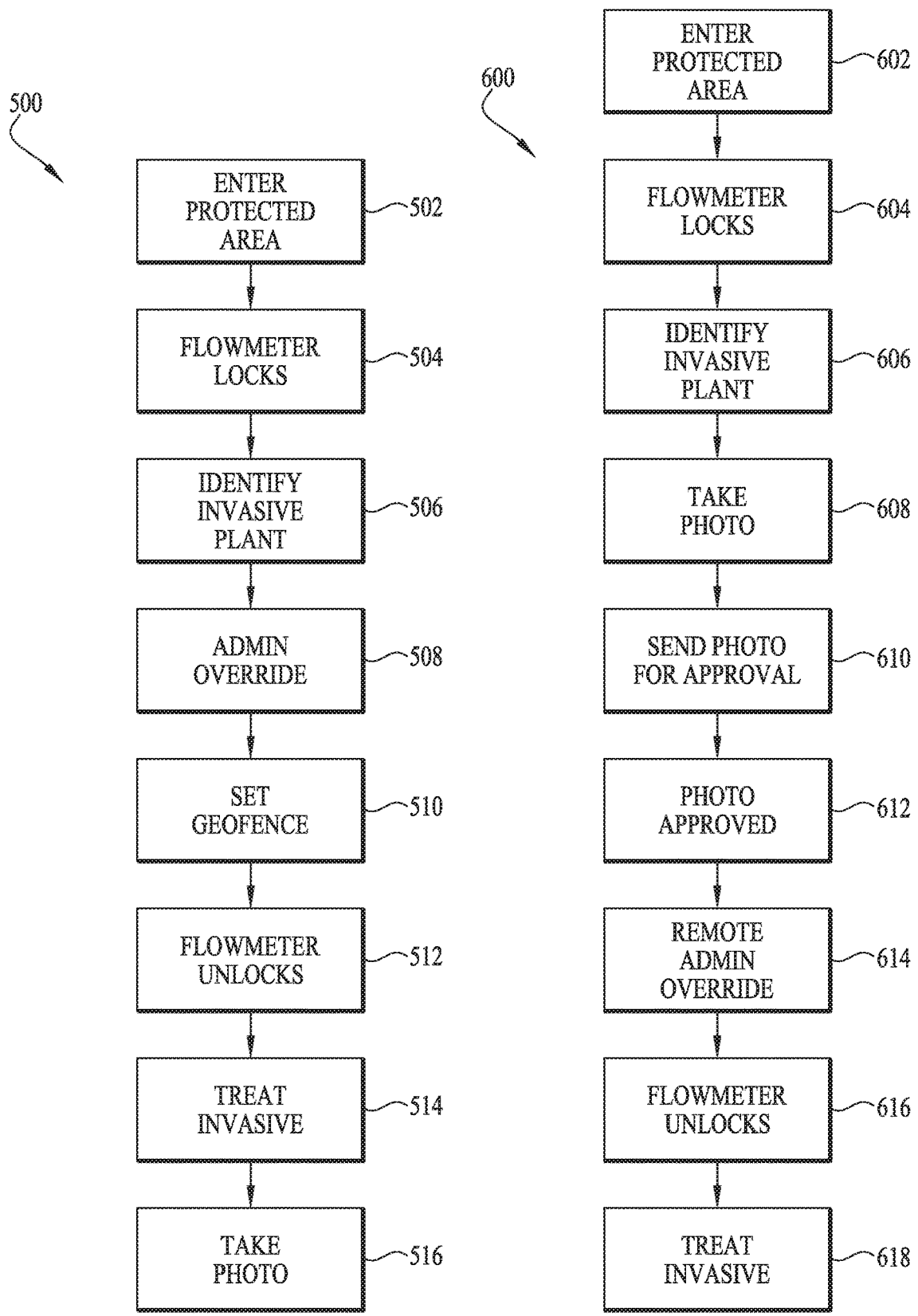

FLUID METERING COMPONENT AND SPRAYING APPARATUSES THEREOF

CROSS REFERENCE TO RELATED APPLICATION

This application claims priority to U.S. Provisional Patent Application Ser. No. 62/746,112 filed Oct. 16, 2018, the entirety of which is incorporated by reference herein.

TECHNICAL FIELD

The present invention relates to a fluid metering component and more particularly to spraying apparatuses having a fluid metering component that is linkable with an electronic device.

BACKGROUND OF THE INVENTION

Sprayers and other pesticide applicators are known. Typically, a sprayer includes a reservoir for containing a liquid or pesticide, a manual pump for pressurizing the reservoir, and a hand-held spray wand and trigger for permitting the manual discharge of the liquids therefrom. Continuous improvements to fluid metering components and spray apparatuses and pesticide applicators are sought. It is to the provision of a portable spraying apparatus meeting these and other needs that the present invention is primarily directed.

SUMMARY OF THE INVENTION

In example embodiments, the present invention provides a portable spraying apparatus for the manual dispensing of a liquid or pesticide therefrom. In example embodiments, the portable spraying apparatus includes an intelligent metering device so as to monitor the quantity of liquid or pesticide being discharged from the portable spraying apparatus. In some example embodiments, the present invention relates to systems and methods for dispensing a liquid while generating data associated with the liquid being dispensed. In example embodiments, data generated and collected may include the quantity of liquid being discharged, the rate of flow of the liquid being discharged, the GPS location associated with the location where the liquid is discharged, the type or composition of the liquid being discharged, one or more photographic images of the location before and/or while the liquid is being discharged, etc. According to some example embodiments, the intelligent metering device communicates with an electronic device, for example, a smart phone or tablet, such that data regarding the liquid being discharged is collected and processed by the electronic device. In some example embodiments, the intelligent metering device and/or the electronic device is configured for providing feedback to a user operating the portable spraying apparatus. According to one example embodiment, feedback can be proved to a used base on the user's location so as to prevent the user from spraying the liquid in an undesirable location or area.

In one aspect, the invention relates to a fluid metering device including a housing, an isolated fluid conduit formed in the housing, a metering assembly, an electronics assembly and a power assembly.

In example embodiments, the metering assembly includes a turbine rotationally mounted within the fluid conduit. In example embodiments, the turbine includes a pair of oppositely-positioned magnetic elements embedded therein. In example embodiments, the electronics assembly includes a PCB board, a microprocessor, a Hall Effect sensor, a thermistor, and a Bluetooth component. In example embodiments, the Hall Effect sensor is positioned in close proximity to the turbine so as to sense a change in the magnetic field as the turbine rotates and provide a count related to the rotations thereof. In example embodiments, the count of rotations sensed by the Hall Effect sensor is processed by the microprocessor in real time, and wherein a time stamp is provided for each count such that the flow rate and quantity of a fluid passing through the fluid conduit and causing rotation of the turbine can be determined. In example embodiments, an electronic device is connectable with the electronics assembly such that the count of turbine rotations and time stamp data from the microprocessor can be received and processed, and calculations can determine the flow rate and quantity of fluid that passed through the metering assembly. In example embodiments, the temperature of the fluid can be measured and collected in real time as it passes through the fluid conduit, wherein the thermistor is secured within a portion of the housing and nearby the fluid conduit. In example embodiments, the electronics assembly further includes a GPS and/or cellular component for attachment to the PCB board, the GPS component capable of obtaining the location of the fluid metering component and the cellular component connectable with one or more cellular networks such that data received by the microprocessor can be further sent in real time to a database or cloud server in a remote location.

In another aspect, the present invention relates to a spraying apparatus including a fluid metering component, the fluid metering component including a housing, an isolated fluid conduit formed in the housing, a metering assembly, an electronics assembly and a power assembly.

In example embodiments, an electronic device can be provided for wirelessly connecting with the fluid metering device such that data collected from the fluid metering device is sent to the electronic device in real time. In example embodiments, the electronic device includes software or an application for determining the chances of volatilization of the fluid that is to be dispensed from the spray apparatus, the software or application calculating the chances of volatilization based on factors including the temperature of the fluid; the atmospheric temperature, wind speeds, humidity and chances of precipitation.

In yet another aspect, the invention relates to a fluid metering component including an inlet, and outlet, a metering assembly, a electronics assembly and a power assembly, the electronics assembly having a temperature sensor so as to monitor the temperature, in real time, of a fluid flowing from the inlet to the outlet.

In yet another aspect, the invention relates to a method of determining the chances of volatilization of a chemical herbicide or pesticide including determining the particular chemical to be applied, obtaining data relative to one or more present and future environmental factors and weather conditions for a particular location, and measuring and monitoring the temperature of the chemical in real time.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 1 is a perspective view of an intelligent metering device according to an example embodiment of the present invention.

FIG. 2 is a top view of the intelligent metering device of FIG. 1.

FIG. 12 shows a flow chart of a spraying apparatus and intelligent metering device according to an example embodiment of the present invention.

FIG. 13 shows a flow chart of the operational procedures of a spraying apparatus having an intelligent metering system according to an example embodiment of the present invention.

FIG. 14 shows a flow chart of the operational procedures of a spraying apparatus having an intelligent metering system according to another example embodiment of the present invention.

DETAILED DESCRIPTION OF EXAMPLE EMBODIMENTS

Figure 3:
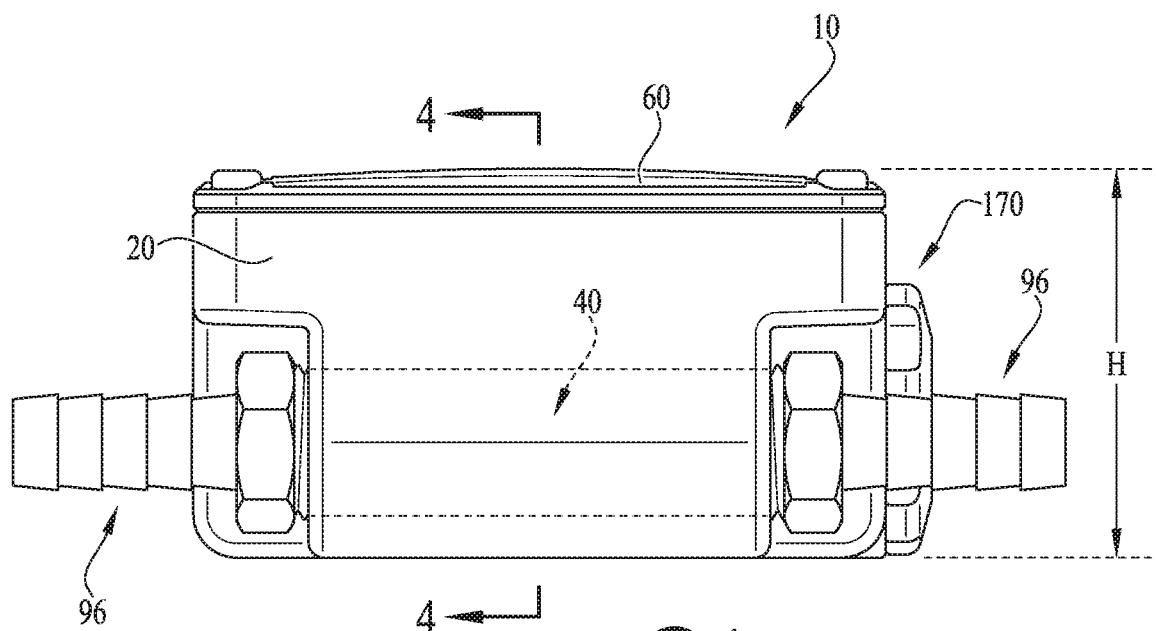
FIG. 3 is a side view of the intelligent metering device of FIG. 1.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-7 show an intelligent metering device 10 according to an example embodiment of the present invention. In example embodiments, the intelligent metering device 10 is connectable between two hose or conduit sections, for example, so as to measure or quantify the quantity or amount of liquid that passes therethrough. In example embodiments, the intelligent metering component 10 comprises a top 12, a bottom 14, a first end 16 and a second end 18. In example embodiments, a first barbed fitting 96 is secured near the first end 16 and a second barbed fitting 96 is secured near the second end 18.

As will be described in greater detail below, the intelligent metering device 10 comprises a chassis or housing 20 and a lid 60, and a fluid conduit 40 is isolated within a portion of the housing 20 for permitting a fluid to pass therethrough to be quantified or measured. For example, according to example embodiments, the first barbed fitting 96 is fluidly connected to a first end 42 of the conduit 40 and the second barbed fitting 96 is fluidly connected to a second end 44 of the conduit 40. Thus, according to example embodiments of the present invention, any liquid passing through a hose or conduit can be quantified by incorporating the intelligent metering device 10 therebetween, for example, by connecting a first conduit to the first barbed fitting 96 and a second conduit to the second barbed fitting 96.

Figure 5:
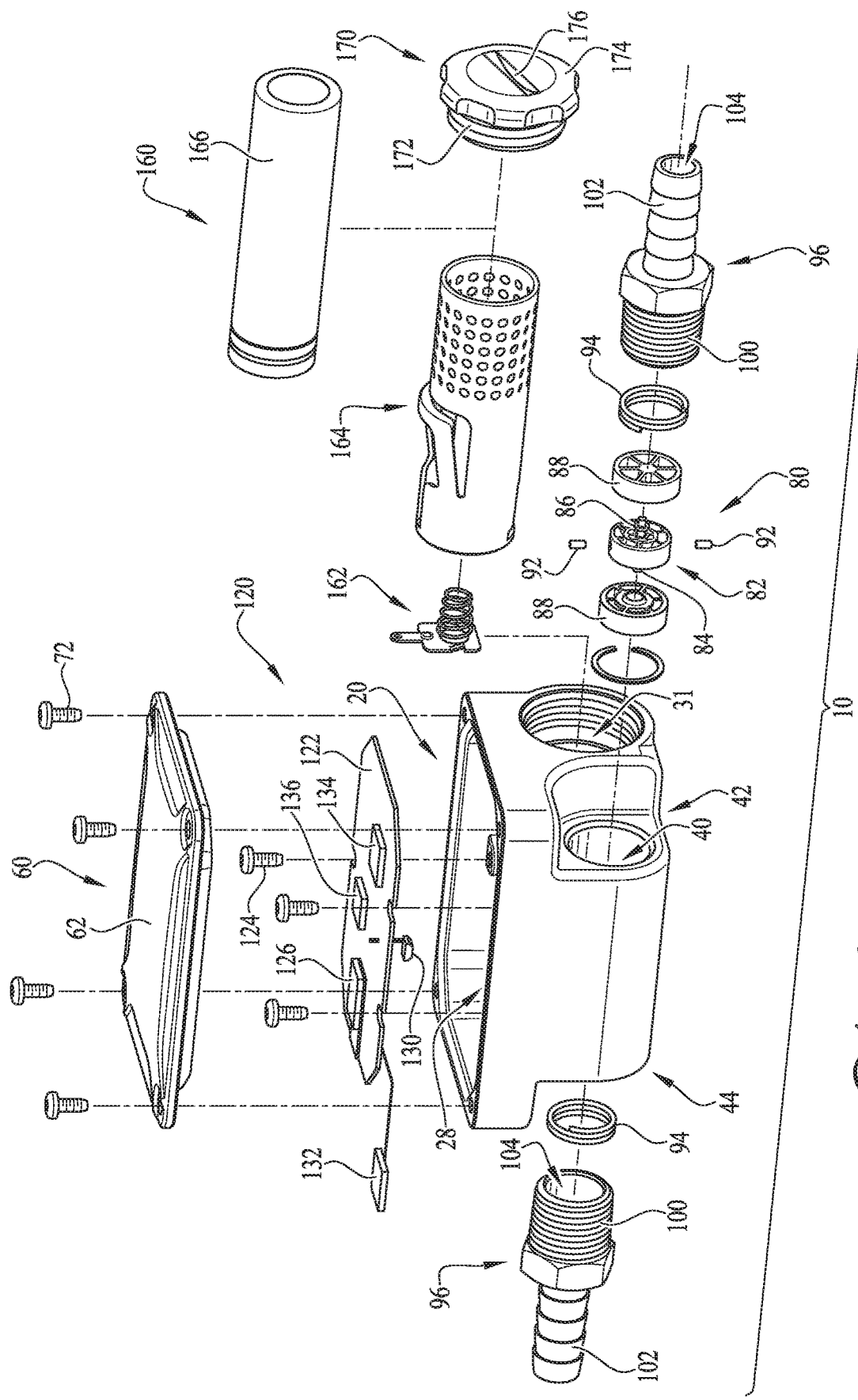
FIG. 5 is an assembly view of the intelligent metering device of FIG. 1.

According to example embodiments, the intelligent metering device 10 comprises a metering assembly 80, an electronics assembly 120 and a power assembly 160 (see FIG. 5). In example embodiments, the metering assembly 80 comprises a flow meter or other device to measure the flow of a liquid passing through the conduit 40. The electronics assembly 120 preferably obtains data from the metering assembly 80 (or flow meter thereof) regarding the fluid passing through the conduit, for example, which in turn transmits or sends the data to an electronic device D. The electronic device D, once the data is received, performs one or more calculations so as obtain the quantity of liquid that passed through the conduit 40 (and metering assembly 80 thereof). The power assembly 160 provides power to the electronics assembly 120 such that the metering assembly 80 can communicate with the electronics assembly 120 while also providing for the electronics assembly 120 (or components thereof) to connect and communicate with the electronic device D. In example embodiments, the electronics assembly 120 and the electronic device D are wirelessly connectable with each other. In other example embodiments, a wired connection can be provided between the electronics assembly 120 and the electronic device D.

As depicted in FIGS. 2-3, the intelligent metering component 10 comprises a width W, a length L and a height H. In example embodiments, the width W is between about 1-4 inches, for example about 2.25 inches according to one example embodiment. The length L is between about 2-8 inches, for example about 3.20 inches according to one example embodiment. The height H is between about 1-6 inches, for example about 1.69 inches according to one example embodiment. In other example embodiments, the width W, length L and height H of the intelligent metering component 10 can be sized as desired.

Figure 4:
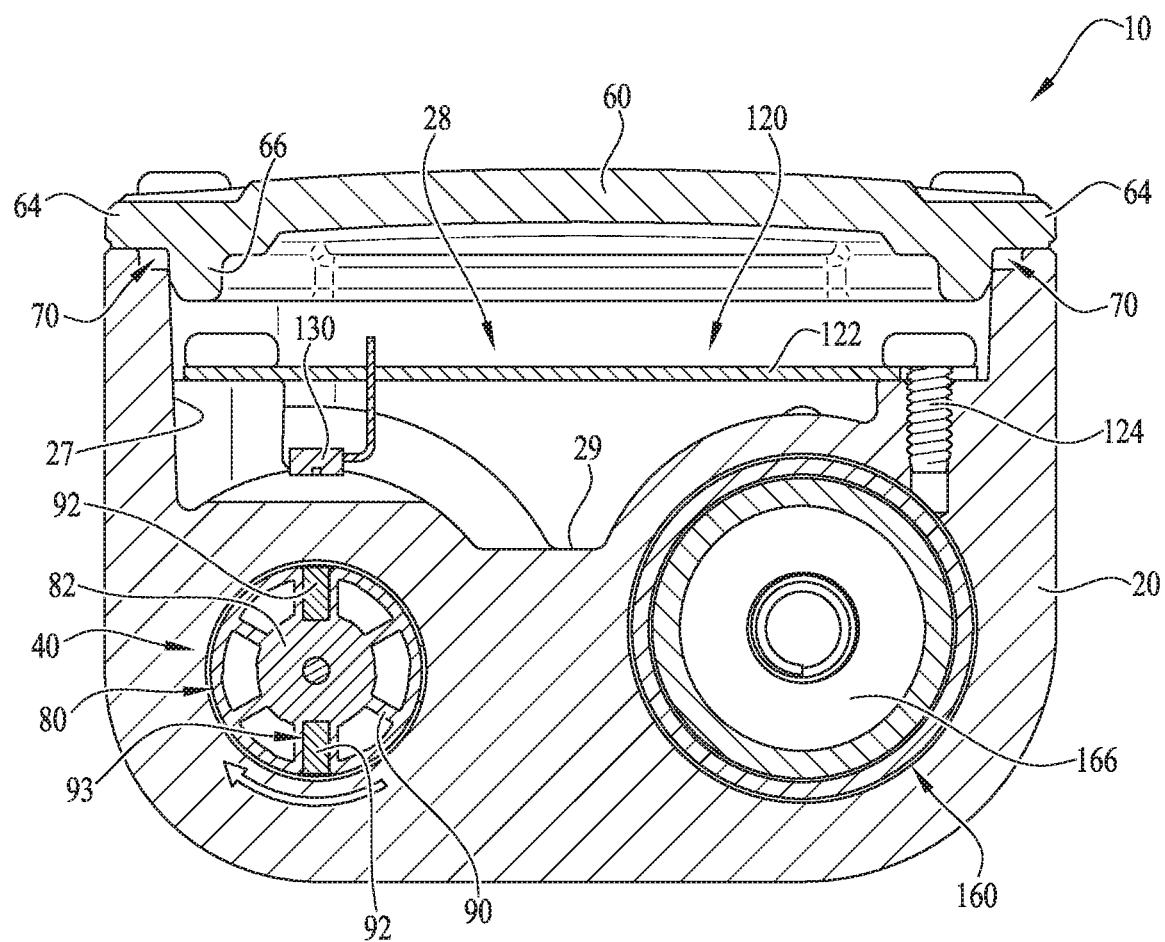
FIG. 4 is a cross sectional view of the intelligent metering device of FIG. 3 taken along line 4-4.

As depicted in FIG. 4, the housing 20 preferably contains or houses the metering assembly 80, the electronics assembly 120 and the power assembly 160. In example embodiments, the metering assembly 80 is preferably mounted within the conduit 40 that is isolated within a portion of the housing 20. For example, in example embodiments, the conduit 40 of the housing 20 is preferably entirely isolated from any other portion of the housing, for example, wherein access within the conduit 40 is only permitted by either the first end opening 42 or the second end opening 44 (see FIGS. 5-6). Thus, by isolating the conduit 40, the risk of a liquid (that is passing through the conduit to be quantified) contaminating any other portions of the intelligent metering device 10 is entirely eliminated.

The housing 20 is configured for sealing engagement with the lid 60, and the electronics assembly 120 is mounted within an internal cavity 28 of the housing 20 between a bottom or interior side of the lid 60 and a floor or bottom 29 of the internal cavity 28 of the housing 20. The power assembly 160 is fitted within a portion of the housing 20 and electrically connected to the electronics assembly 120, for example, to provide power thereto. In example embodiments, a closure or cap 170 is fitted with a portion of the housing so as to contain the power assembly 160 within the housing 20. Preferably, the cap 170 is sealingly engaged with the housing 20 so as to prevent any contaminants or other undesirable contamination thereof.

Referring back to the metering assembly 80, a turbine 82 is provided for rotationally mounting within the conduit 40, for example, such that a liquid flowing therethrough causes rotation of the turbine 82, which can be further translated into an accurate calculation of the quantity of the liquid passing therethrough. As depicted in FIG. 4, the turbine comprises one or more pitched veins 90 and passageways such that a liquid passing therethrough causes rotation thereof. According to one example embodiment, a pair of magnetic components 92 are oppositely positioned (e.g., 180 degrees apart) within outer periphery portions (e.g., receivers 93) of the turbine 82, and a sensor 130 of the electronics assembly 120 remains substantially suspended above and near the turbine 82. Preferably, as the turbine 82 rotates, the sensor 130 monitors/measures the magnitude of a magnetic field in its proximity. And due to the magnetic components 92 being provided with the turbine 82, the magnitude of the magnetic field (and voltage of the sensor 130) peaks each time one of the magnetic components 92 passes by the suspended sensor 130. Thus, according to example embodiments, for every two magnetic field peaks, the turbine 82 has completed one rotation. As such, data obtained from the sensor 130 is collected or sent directly to the electronic device D such that the peaks in magnetic field (or voltage) can be translated into a flow rate, and thus, the quantity of the liquid that passed through the turbine 82.

According to one example embodiment, the magnetic components 92 are configured to be received within the receivers 93 of the turbine 82 such that their south poles are facing outwards, for example, to be in closest proximity with the sensor 130 when the magnetic component 92 is nearest to the sensor 130. According to example embodiments, the south poles of the magnets facing outwards is configured to operate with a unipolar Hall Effect sensor. According to other example embodiments, the poles of one of the magnets can be reversed such that the turbine 82 could be operational with a bipolar Hall Effect sensor. In other example embodiments, the magnetic components 92 can preferably oriented and configured as desired. According to some example embodiments, the turbine 82 comprises a plurality of receivers 93 for receiving a plurality of magnets, for example, 3 or more magnets that are evenly positioned around the circumference of the turbine 82.

According to one example embodiment, the sensor 130 is a Hall Effect sensor, for example, a sensor that is capable of measuring the magnetic flux or magnitude of the magnetic field. As similarly described above, as the turbine 82 rotates, the sensor 130 monitors/measures the magnet flux in its proximity. And due to the magnetic components 92 being provided with the turbine 82, the magnitude of the magnetic field (and voltage of the sensor 130) peaks each time one of the magnetic components 92 passes by the suspended sensor 130. And, for every two magnetic field peaks, the turbine 82 has completed one rotation. As such, a microprocessor 126 of the electronics assembly 120 collects the data obtained from the sensor 130 and assigns an accurate time stamp with each corresponding change in magnetic flux (e.g., a count). Accordingly, a data set is generated to include a plurality of time stamps that are related to each change (or count) in magnetic flux sensed by the sensor 130. In example embodiments, the data set of time stamps is generated by the microprocessor 126 and then sent to the electronic device D as a complete package for further processing, calculations, etc. to ultimately determine the flow rate and quantity of liquid that passed through the turbine 82.

According to another example embodiment, a time stamp is generated by the microprocessor 126 for each change in magnetic flux, which is sent to the electronic device in real time, for example, rather than generating a complete package of time stamps prior to sending the data to the electronic device D. Thus, according to some example embodiments, the flow rate and/or quantity of fluid that is passing through the conduit 40 can be obtained in real time during operation of the intelligent metering device 10. For example, according to example embodiments, the electronic device D can comprise one or more indicators (e.g., on a visual screen thereof) such as current flow rate, quantity of liquid used, quantity of liquid remaining, etc.

According to alternate example embodiments, the metering assembly 80 can be configured as desired, for example, such that other components or principles can be used to determine the flow rate of the fluid (and thus the quantity of fluid). In example embodiments, alternative principles or components that can be used include orifices, venturies, nozzles, rotameters, pitot tubes, calorimetrics, turbine, vortex, electromagnetic, doppler, ultrasonic, thermal and/or coriolis or any combination thereof. According to some example embodiments, the components and principles can be based on differential pressure, velocity, positive displacement and/or mass of the liquid. According to another example embodiment, the metering assembly operates based on the principle of positive displacement, for example a positive displacement flow meter. In other example embodiments, other principles and/or methods can be used to determine the rate of flow of the liquid passing therethrough. Preferably, in the case that other components and/or principles are used to determine the flow rate, the electronics assembly comprises one or more components that are compatible and have the ability to function with the one or more components or principles of the metering assembly.

FIG. 5 shows an exploded or assembly view of the intelligent metering component 10. As described above, the intelligent metering component comprises the chassis 20, the lid 60, the metering assembly 80, the electronics assembly 120 and the power assembly 160. In example embodiments, the metering assembly 80 is contained within the isolated conduit 40 of the housing 20. In example embodiments, the metering assembly 80 comprises the turbine 82, a spindle 84, bearings 86, a housing 88, the magnetic cylinders 92, a pair of compression springs 94, and the pair of barbed fittings 96 for attachment to the first and second end openings 42, 44 of the conduit 40. In example embodiments, the bearings 86 comprise sapphire bearings, for example, which are substantially low friction and highly chemical resistant. In example embodiments, a bearing 86 is fitted within each housing portion 88, and the spindle 84 extending from either side of the turbine 82 is rotatably mounted to the bearings 86 that is supported by the housing portions 88, and thus, permits substantially frictionless rotation of the turbine 82 (see FIG. 7). In example embodiments, the turbine 82 is generally positioned at a midpoint of the conduit 40. In other example embodiments, the turbine 82 can be positioned within the conduit 40 as desired.

Once the turbine 82 is rotatably mounted within the conduit 40, a compression spring 94 is positioned on either side of the turbine 82 (e.g., the housing portions 88 thereof), and threaded ends 100 of the barbed fittings 96 are engaged with the first and second open ends 42, 44 of the conduit 40. In example embodiments, the barbed fitting 96 comprises the threaded end 100, a barbed end 102, and a central opening extending therethrough. Accordingly, in example embodiments, a conduit or hose portion that is carrying a fluid therein can be connected (e.g., sealingly engaged) to the barbed ends 102 of the barbed fittings 96 such that the fluid being carried within the hose is required to pass through the conduit 40, and thus pass through the turbine 82. According to example embodiments, one or more clamps or hose ties or other fasteners can be provided for further securing the hose portions to the barbed ends 102 of the barbed fittings 96.

According to one example embodiment, the conduit 40 and metering assembly 80 are generally sized for low volume applications, for example, wherein a spraying apparatus to be worn by a user comprises a reservoir of about 5 gallons. Thus according to some example embodiments, the common flow rates of the liquid passing through the conduit 40 and metering component 80 are typically between about 0 gal/min to about 5 gal/min. According to another example embodiment, the conduit 40 and metering component can be configured for medium or high volume applications, for example, wherein the liquid or fluid passing through the conduit and metering component 80 comprises a flow rate of between about 0 gal/min to about 48 gal/min, Thus, according to example embodiments of the present invention, the intelligent metering device 10 (and conduit 40 and metering assembly 80) can preferably be sized and equipped so as to accurately measure the liquid or fluid passing therethrough, for example, whether the fluid is still or static (0 gal/min), whether the fluid is passing therethrough at generally slow rates (0.001 gal/min-5 gal/min), or whether the fluid is passing therethrough at generally faster rates (10 gal/min-48 gal/min).

According to some example embodiments, the relationship between the RPM of the turbine 82 and the flow rate are substantially linear, and thus, calculating the flow rate (and ultimately the quantity of liquid dispensed) is a relatively simple calculation. For example, according to some example embodiments, a coefficient can be determined based on a specific RMP and flow rate, and thus, since there is a linear relationship other flow rates can be calculated given the coefficient and the RPM of the turbine. According to other example embodiments, the relationship of the RPM of the turbine 82 and the corresponding flow rate are more non-linear than linear, and thus, new coefficients must be determined based on a particular flow, for example, to determine the accurate flow rate (and quantity of liquid dispensed). Thus, according to example embodiments of the present invention, the metering component 80 can be calibrated based on various flow rates (e.g., and RPMs of the turbine 82) such that an accurate calculation can be made regardless of the flow rate of the fluid passing through the metering assembly 80.

The electronics assembly 120 is preferably contained within the housing 20 (e.g., within the internal cavity 28) and comprises a PCB board 122, the microprocessor 126, the Hall Effect sensor 130, a temperature sensor or thermistor 132 and a Bluetooth chip 134. In example embodiments, one or more fasteners 124 are provided for securing the PCB board 122 to a mounting platform 34 that is formed within a portion of the internal cavity 28 of the housing 20 (see FIG. 6). For example, according to one example embodiment, three individual platforms 34 are provided within the housing 20 and comprise three fastener receivers 36 that are configured for engagement with the fasteners 124.

In example embodiments, the PCB board 122 is positioned within the internal cavity 28 of the housing 20, for example, at least partially spaced a distance from an interior side of the lid 60 and at least partially spaced a distance from the floor 29 of the internal cavity 28. The microprocessor 126, Hall Effect sensor 130 and thermistor 132 are electrically connected with the PCB board 122, In example embodiments, the Hall Effect sensor 130 is connected with the PCB board 122 and at least partially suspended therefrom so as to be generally positioned directly above the position of the turbine 82 (e.g., so as to sense a change in magnetic flux from the turbine's rotation and magnets 92 thereof passing by).

Figure 6:
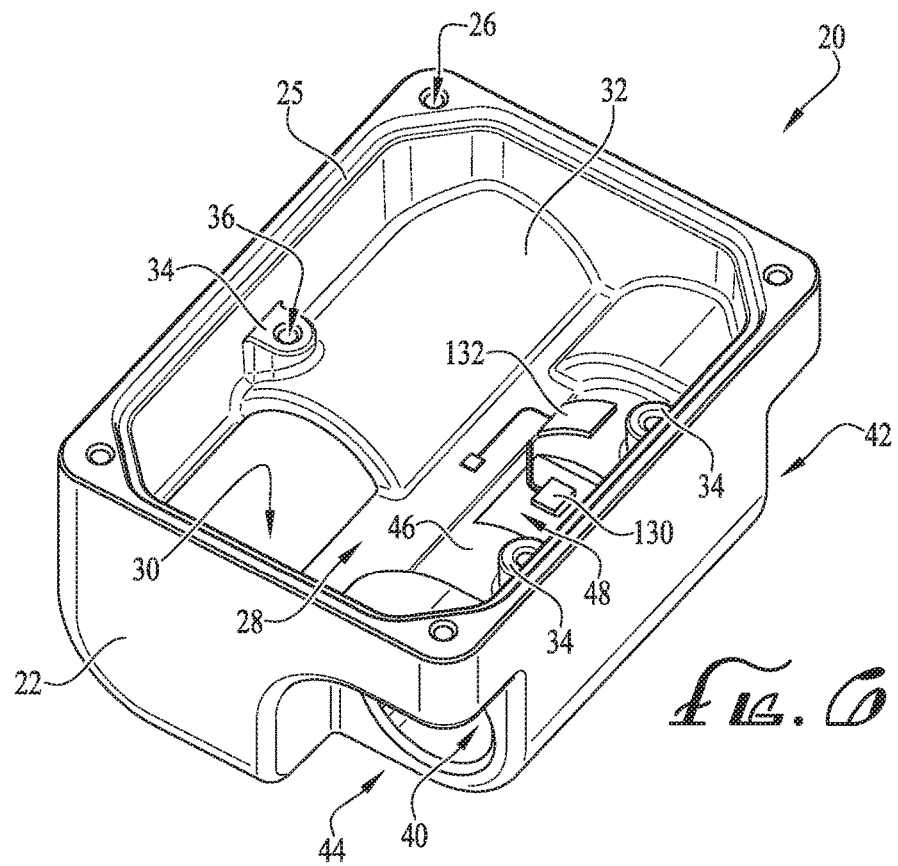
FIG. 6 is a top perspective view of a chassis of the intelligent metering device of FIG. 5.
Figure 7:
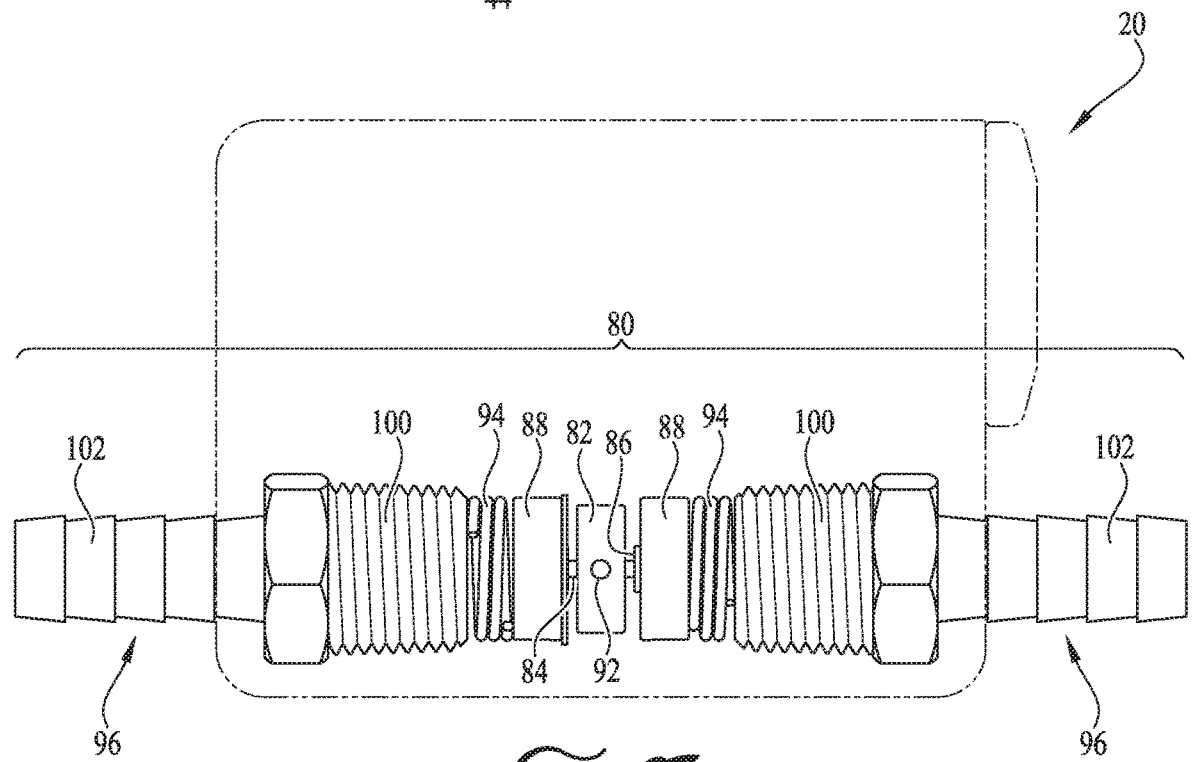
FIG. 7 is a top view of the intelligent metering device of FIG. 1, and showing a metering assembly thereof that is positioned within the chassis for measuring the quantity of a fluid passing therethrough.

As depicted in FIG. 6, an interior wall 46 of the conduit 40 comprises a recessed portion or cutout 48, for example, which provides a reduced wall thickness between the internal cavity 28 and the conduit 40. In example embodiments, the cutout 48 is configured to align with the Hall Effect sensor 130 when the electronics assembly 120 is mounted within the internal cavity 28 of the housing 20. According to example embodiments, the housing comprises aluminum, and thus, is non ferromagnetic such that the sensor 130 is still able to sense changes in the magnetic flux, and thus, able to determine and count rotations of the turbine 82. For example, referring back to FIG. 4, the thickness defined between the cutout 48 and the closest portion of the conduit 40 is between about 0.1-0.35 inches, for example about 0.14 inches according to one example embodiment. According to another example embodiment, the thickness defined between the cutout 48 and the closest portion of the conduit 40 is 0.14 inches. According to example embodiments, the Hall Effect sensor 130 is positioned within a portion of the cutout 48 and suspended about 0.06 inches above the surface thereof, for example such that the magnitude of the magnetic field or magnetic flux can be sensed and provide accurate data for processing and calculating the flow rate, quantity of fluid being dispensed, etc. According to other example embodiments; the Hall Effect sensor 130 is positioned within a portion of the cutout 48 and positioned directly on the surface thereof, or for example, the sensor 130 can be suspended between about 0.00001-0.15 inches above the surface thereof.

In example embodiments, the thermistor 132 comprises a sensing portion, a connector and at least some kind of conductive wiring connected therebetween. In example embodiments and as depicted in FIG. 6, the sensing portion of the thermistor 132 is secured directly to the interior wall 46 of the conduit 40 (e.g., adhesive, glue, connectors, fasteners, etc.) and the connector is connected to the PCB board 122 (or one or more components thereof). In example embodiments, the sensing portion of the thermistor 132 preferably obtains the temperature of the fluid or liquid passing through the conduit 40 in real time, for example, which can similarly be collected by the microprocessor and transmitted to the electronic device D. Preferably, with the interior wall 46 of the conduit being substantially thermally conductive (e.g., aluminum), the surface temperature of the wall 46 is substantially similar to the temperature of the fluid passing through the conduit 40. Thus, by measuring the temperature of the wall 46, the temperature of the fluid passing through the conduit can be obtained. As will be described in greater detail below, certain temperatures (e.g., temperature of the liquid being dispensed) and weather conditions may substantially increase the risk of volatilization of one or more liquids or fluids being dispensed in the atmosphere or on a target plant or crop after passing through the intelligent metering device 10. As such, by obtaining the temperature of the liquid or fluid passing through the conduit, one or more precautionary measures may be taken so as to prevent the volatilization thereof.

According to one example embodiment, the wall thickness that is defined between the interior wall section 46 and the fluid conduit 40 is between about 0.05-0.55 inches, for example about 0.205 inches according to one example embodiment. According to another example embodiment, the wall thickness defined between the interior wall section 46 and the fluid conduit 40 is 0.205 inches. Accordingly, as aluminum is substantially thermally conductive, a barrier of about 0.205 inches (defined between the thermistor 132 and the liquid or fluid flowing through the conduit 40) minimally, if any whatsoever, interferes with obtaining an accurate or exact temperature measurement of the fluid. According to example embodiments, the thermistor 132 comprises a NTC self-adhering temperature sensor. According to another example embodiment of the present invention, a threaded temperature probe can be provided and generally secured by a threaded connection with the interior wall section 46 (e.g., wherein a portion thereof is in fluid communication with the conduit 40). In alternative example embodiments, other hardware, devices, etc. can be provided to obtain the temperature of the fluid passing through the conduit 40 in real time.

Referring back to FIG. 5, the PCB board 122 (or electronics assembly 120) can comprise one or more additional components such as a GPS chip 136, a cellular chip and/or other components or hardware as desired. Thus, according to some example embodiments of the present invention, the intelligent metering device 10 can communicate directly with a database, cellular network, a server or other platform that is connected to the internet or other network. As such, according to some example embodiments, the electronic device D may not be a necessity to provide for functionality of the metering device 10. According to some example embodiments, the electronic device D is connected with the metering device 10 for the sole purpose of providing alerts to the user should any be necessary. In other example embodiments, the electronic device D receives all the data from the electronics assembly for further processing and calculations.

The power assembly 160 comprises a battery contact element 162, a battery sleeve 164, a battery 166 and the battery cap or closure 170. In example embodiments, the housing 20 comprises a power reservoir 30 and a partial wall portion 32 that defines a portion of the reservoir 30. The battery contact element 162 is fitted within the reservoir 30 near the second end 18 of the device 10 so as to provide electrical contact with the battery 166 and the PCB board 122. The battery sleeve 164 is fitted within the reservoir 30 and is preferably sized to provide for fitting engagement within the reservoir 30 (and the battery 166 providing fitting engagement within the sleeve 164). In example embodiments, the sleeve 164 comprises a latch portion that is configured for engagement with an end of the portion wall portion 32 of the cavity 30, for example, such that the sleeve 164 remains engaged within the cavity 30. The battery can then freely slide in and out of the sleeve 164 that is contained within the cavity 30, and the cap or closure 170 can be connected to an opening 31 of the cavity, for example, which permits access to the cavity 30 and thus the battery 166 therein. The closure 170 comprises a threaded end 172 for attachment to the opening 31 and an engagement or grasping end 174 for grasping or manual manipulation. In some example embodiments, a slot or receiver 176 can be provided for permitting a tool to assist in the attachment detachment of the closure 170 with the housing 20.

In example embodiments, the battery 166 comprises a 18650 lithium-ion rechargeable battery comprising a capacity of about 3500 mAh, a diameter of about 18 mm and a length of about 65 mm. According to example embodiments of the present invention, the battery 166 comprises a capacity sufficient enough such that the intelligent metering device 10 can fully function for between about 5-25 days. For example, according to one example embodiment, the battery 166 comprises a capacity of about 3300 mAh and can power the device 10 for about 7-10 working days. According to one example embodiment, the battery 166 comprises a capacity sufficient to power the device 10 for 7 working days. In other example embodiments, one or more batteries of a desired construction, capacity, and size can be provided as desired.

According to example embodiments, the battery 166 is preferably rechargeable, and thus, is to be replaced or swapped out for a fully-charged battery as needed. According to some example embodiments, one or more ports can be provided the device 10 or power assembly 160 so as to permit recharging of the battery 166 while it remains within the device 10. For example, according to one example embodiment, the battery 166 need not be removed from the device 10, but rather a charging cable can be connected to the device 10 such that the battery 166 is recharged while remaining within the device 10. According to other example embodiments, an external power supply can be provided for connecting with the device 10 should the battery 166 contained within the device 10 be completely dead or low on power. According to another example embodiment, the battery 166 is intended to remain within the device 10, and thus, recharging thereof requires connecting the device 10 with a charger. In other example embodiments, the battery 166 can be configured for wireless charging, for example, induction charging. According to another example embodiment, the battery 166 is not rechargeable and is replaced as needed. According to another example embodiment, one or more alternative energy sources can be provided for powering the device 10. In some example embodiments, the device 10 comprises an internal energy generating element, for example, such that movement and motion of the device 10 recharges the battery 166. Optionally, one or more solar panels or wind turbines can be implemented (even if miniaturized) so as to provide alternatives to recharging the battery 166.

With reference to FIG. 6, the housing 20 comprises a unitary rectangular body 22 that is typically formed by an investment cast molding process. As described above and according to preferred example embodiments, the housing 20 comprises aluminum. For example, aluminum is both non ferromagnetic and thermally conductive, and thus, permit functionality and accuracy of the Hall Effect sensor 130 and the thermistor 132. According to other example embodiments, the housing 20 can be formed from various other metals, non-metals, plastics, composites, natural materials, synthetic materials and/or other materials and/or combinations thereof as desired. According to example embodiments, the housing 20 comprises a top or upper access opening 24, for example, which is intended to be covered by the lid 60 by one or more fasteners 72. The lid 60 comprises a generally rectangular body 62 that is capable of sealingly engaging with the housing 20. The lid 60 can be formed from aluminum, other metals, plastics, polymers, composites, synthetic materials, natural materials and/or any combination thereof.

In example embodiments, an upper portion of the housing 20 comprises a recessed edge 25 and one or more fastener receivers 26 for providing sealing engagement with the lid 60 and lip 66 thereof, in example embodiments, one or more of the fasteners 72 pass through openings of the lid 60 and engage with the one or more receivers 26 of the housing 20, for example, to secure the lid 60 to the housing. As depicted in FIG. 4, the lip 66 of the lid 60 is generally spaced inwardly from the outer edge 64 thereof to generally engage an interior wall 27 of the housing 20 (e.g., defined by the interior cavity 28), and a seal 70 is formed between the outer edge 64 and lip 66 near the recessed edge 25. According to one example embodiment, the seal 70 can be in the form of a rubber gasket or other generally flexible and resilient material, for example, so as to provide a water-tight seal and prevent any elements, etc. from entering the internal cavity 28. According to another example embodiment, an adhesive, sealant or other caulk or other sealing material can be provided.

Figure 8:
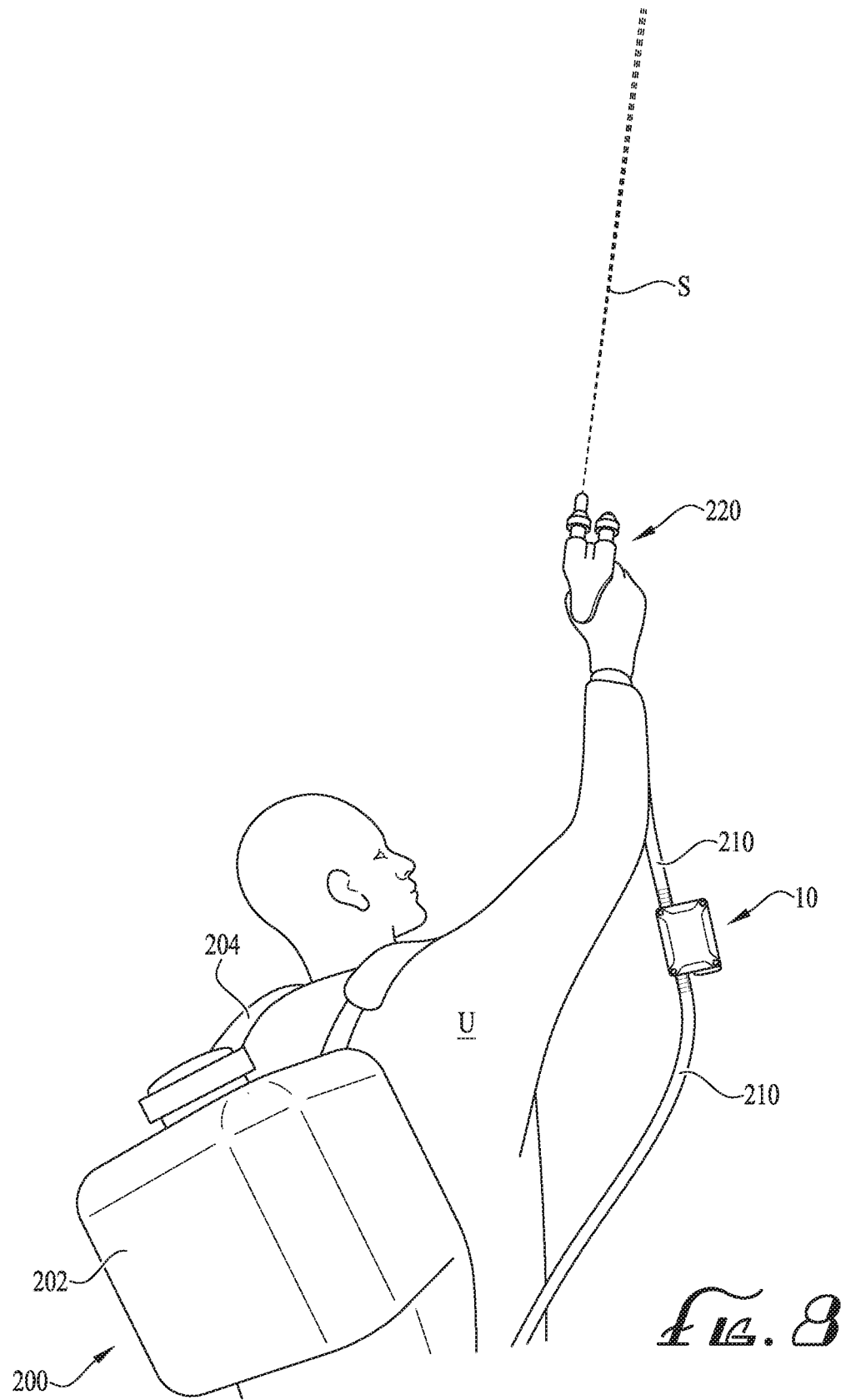
FIG. 8 shows a spraying apparatus according to an example embodiment of the present invention, and showing a single stream of liquid being discharged from a handgun that is manually operated by the user, and showing an intelligent metering device connected to the spraying apparatus according to an example embodiment of the present invention.

According to one example embodiment of the present invention, the intelligent metering device 10 can be used with a portable spraying apparatus 200. For example, as depicted in FIG. 8, the spraying apparatus 200 is generally in the form of a portable backpack spraying device, for example, comprising a reservoir 202 for containing a liquid, for example, a pesticide or other active substance. In example embodiments, one or more straps 204 can be provided so as to carry the reservoir 202 on the back of a user U, for example, as a way to provide a somewhat comfortable payload on the user U as they generally selectively walk along power line pathways and/or other areas to treat, re-treat, or otherwise apply a desirable liquid pesticide, herbicide or other desired liquid composition. A spray wand or gun 220 (to be manually operated by the user U) is fluidly connected to the reservoir by one or more hose or conduit sections 210, and a pump lever 206 is coupled with a pressurizing system (and in communication with the reservoir 202) so as to allow for manual operation to pressurize the reservoir 202. According to example embodiments of the present invention, the intelligent metering device 10 is implemented with the spraying apparatus 200 so as to offer a plurality of advantages that were once only obtainable by approximation.

For example, according to example embodiments of the present invention, a first hose section 210 is fluidly connected from the reservoir 202 to the barbed end 102 of the first end 16, and a second hose section 210 is fluidly connected from the barbed end 102 of the second end 18 to the barbed fitting of the spray gun 220. So for example, according to example embodiments, fluid entering the barbed end 102 (connected to the first end opening 42 of the conduit 40) moves through the conduit 40 and metering assembly 80, and exits from the device 10 at the barbed end 102 that is connected to the second end opening 44 of the conduit 40. The fluid then travels through the second hose section 210 and to the spray gun 220. For example, as depicted in FIG. 8, from the spray gun 220 the liquid moves to the nozzle assembly 225 where liquid can either be output from a first nozzle that provides a single and generally direct jet or stream of liquid 5, or for example, a second nozzle that provides an adjustable-width fan-like or radial profile or more dispersed into smaller droplets to define a spray output area that is adjustable between about 0.125-36 ft$^2$. According to one example embodiment, the second nozzle comprises a rotatable housing so as to provide adjustability to the output. Similarly, the first nozzle can provide adjustability to the liquid being output from the sprayer such that tightening the outer and rotatable portion provides less output and wherein loosening allows for a greater amount of liquid to be output therefrom.

Figure 9:
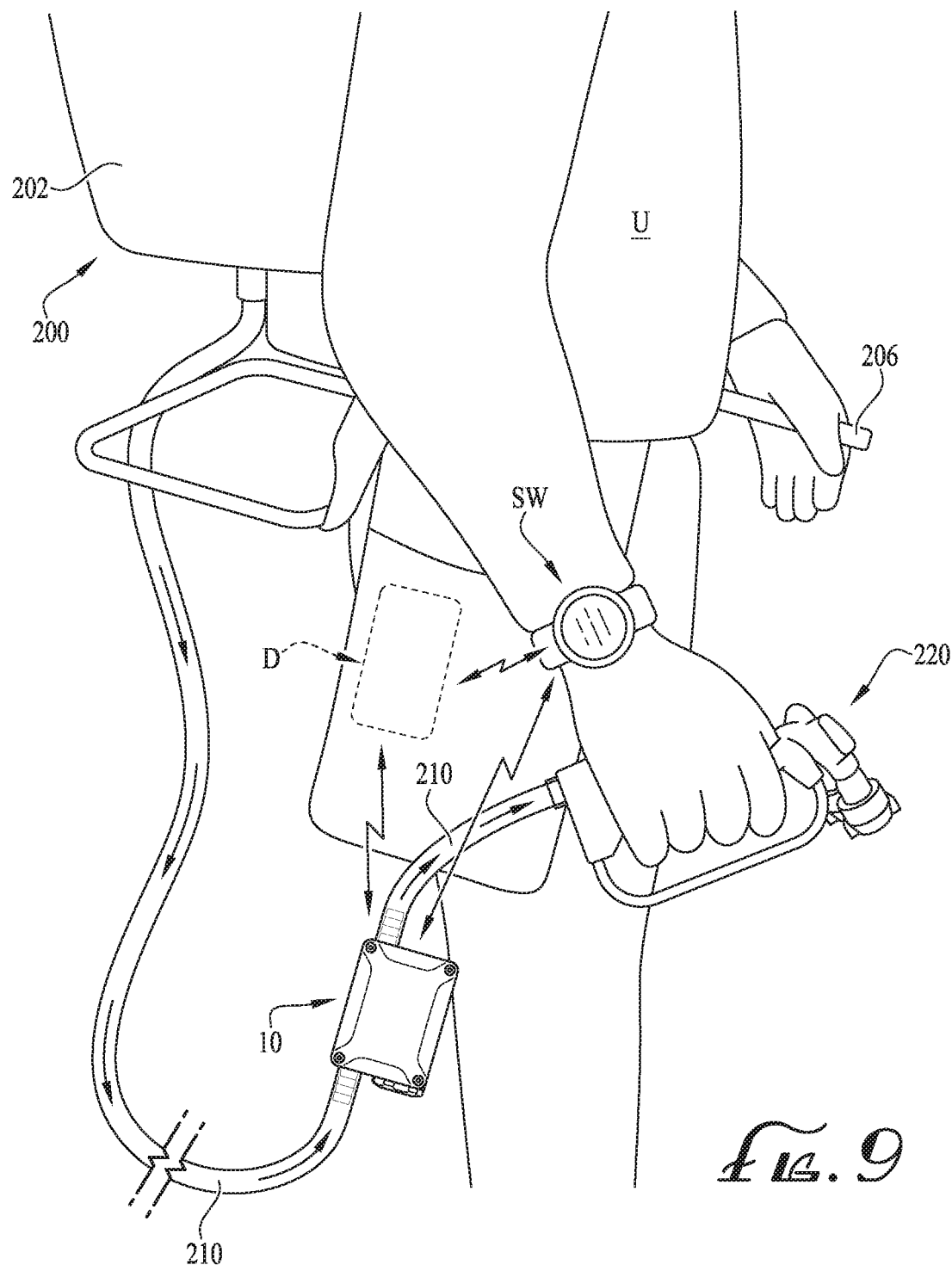
FIG. 9 shows a shows a close-up view of the spraying apparatus of FIG. 8, and further showing the intelligent metering device communicating with an electronic device according to an example embodiment of the present invention.
Figure 10:
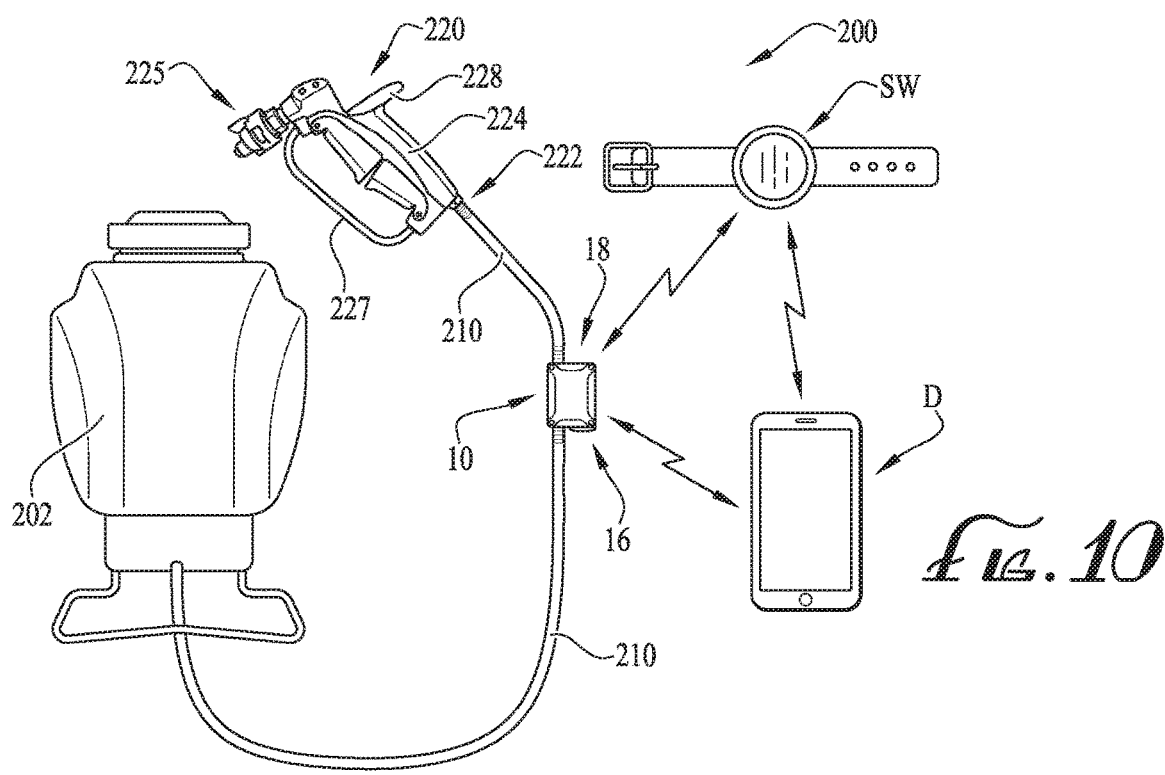
FIG. 10 shows a plan schematic view of the spraying apparatus of FIG. 9.

According to example embodiments of the present invention, the intelligent metering device 10 is connected and communicates with the electronic device D such that data captured by the intelligent metering device 10 (e.g., sensors 130, 132, microprocessor 126 of the electronics assembly 120, etc.) is sent in real time to the electronic device D (see FIGS. 9-10). In example embodiments, the electronic device D is a smart phone or device, or for example, a tablet or other smart device capable of communicating with other devices over one or more signals and/or networks and/or hosting/receiving stations or radios, or other wireless communication systems and/or methods. For example, according to one example embodiment, the intelligent metering device 10 is wirelessly connected to the electronic device D via a Bluetooth signal (e.g., Bluetooth chip 134 of the electronics assembly wirelessly connects with electronic device D). Optionally, other means of connection such as WiFi, infrared (IR), radio (RF) or other means for wirelessly connecting two electronic components can be provided as desired, for example, such that data being collected by the intelligent metering device 10 can be sent directly to the device D in real time. Similarly and as described above, data can be sent from the electronic device D to the intelligent metering device 10 in real time.

Figure 11:
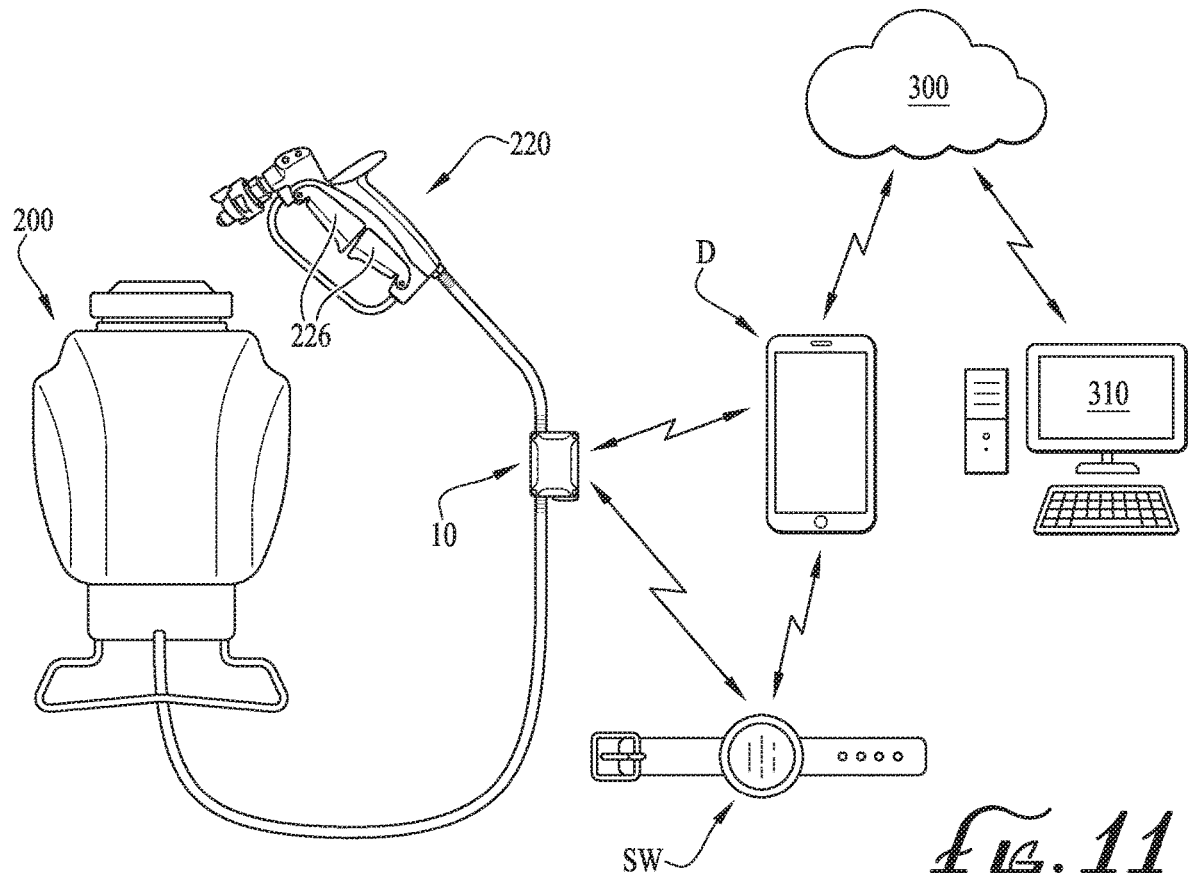
FIG. 11 shows a plan schematic view of a spraying apparatus according to another example embodiment of the present invention.

In example embodiments, the data, once received by the electronic device D can be processed and stored as desired. According to one example embodiment, by connection of the intelligent metering device 10 and the electronic device D via Bluetooth, data captured by the Hall Effect sensor 130 and thermistor 132 (and microprocessor 126) of the electronics assembly 120 is sent therefrom and accepted or received by the electronic device D. Thereafter, a software application of the electronic device D receives and processes the data as desired. According to one example embodiment, a private server or network is connected and communicates with the software or application of the electronic device D. For example, as depicted in FIG. 11, data obtained by the electronic device D and received from the intelligent metering device 10 can be processed and further sent to a remote server, data center or database 300, for example, which can be stored and/or processed as desired. In example embodiments, once the data is obtained on the database 300, one or more separate, remote or individual personal computers or other electronic devices 310 can access the data that was stored to the database 300.

In example embodiments as depicted in FIGS. 10-11, the spray gun 220 comprises an input coupling or conduit 222 at an end of a housing or grip portion 224. Two pivotable triggers 226 are provided on an inside portion of the grip portion 224 so as to allow an operator to grip the grasping portion 224 and force the triggers 226 to actuate so as to permit flow of the liquid from the nozzle assembly 225. A hand guard 227 and/or an upper flange 228 can be provided so as to support the usability and ergonomics of the handle 220.

According to another example embodiment, the intelligent metering device 10 is configured for connecting with the electronic device D and/or a wearable device or smart watch SW, for example, which can be equipped with hardware and software so as to provide GPS and/or cellular capabilities (see FIGS. 9-11). In example embodiments, the wearable SW comprises Bluetooth capabilities so as to wirelessly connect with the intelligent metering device 10, for example, so that the data captured by the intelligent metering device 10 is sent to the wearable SW in real time. According to one example embodiment, a user U need not have an electronic device D for permitting data from the intelligent metering device 10 to be recorded. For example, as described above, the user U can simply wear or otherwise posses the wearable SW while spraying and/or dispensing the fluid from the spray gun 220. In use, the wearable SW receives the data from the intelligent metering device 10, and once the user U has returned to the office or completes a days work, the wearable SW is connected with a computer or other electronic device to permit the collected data to be saved and processed as desired.

According to another example embodiment, the electronic device D can likewise send data to the intelligent metering device 10 (and electronics assembly 120 thereof), for example, whether it be a software update for one or more components of the intelligent metering device 10, or for example, to provide remote operation of the intelligent metering device 10.

According to another example embodiment, in the case that the user U is relying on the wearable SW to capture data from the intelligent metering device 10, once the wearable SW and electronic device D are in close proximity to each other, the data collected on the wearable SW is transferred to the electronic device D, for example, such that the wearable SW is simply a temporary collection and storage device. In example embodiments, once the data from the wearable SW is transferred to the electronic device D, the data is erased from the wearable SW. According to some example embodiments, a user U utilizes the wearable SW to collect data from the intelligent metering device 10 at one or more separate locations. Thus, after completing one of the locations, the user U, while traveling to the next location temporarily pairs the wearable SW with the electronic device D so as to transfer the data from the previous location to the electronic device D. Once arrived at the next location, the user U reconnects (e.g., pairs) the watch with the intelligent metering device 10 to begin spraying at the next location and with the wearable SW collecting data from the intelligent metering device 10.

According to example embodiments, the electronic device D and/or wearable SW is configured to associate the GPS location of where the data is being collected (e.g., where the user U is spraying). Thus, according to example embodiments, in addition to obtaining data related to the fluid flow and temperature thereof, a location stamp can be provided such that the GPS location of where the user U dispensed the fluids is known. According to example embodiments, one or more interactive maps or other graphical illustrations can be provided so as to determine the location where the user dispensed the fluids and the quantity of fluids dispensed at that particular location. For example, according to one example embodiment, a map of a power line pathway is covered with dots indicating marks where user U sprayed, for example, thereby tracking the exact location (e.g., GPS coordinates) of where the liquid was sprayed. According to example embodiments, not only is the location tracked, but also the quantity of liquid being sprayed at each dot, or for example, an average of the liquid being sprayed throughout a specified area. Optionally, other systems and methods can be provided for tracking and mapping the spray behavior of a user.

According to some example embodiments, the software of the electronic device D (or other software of a personal computer or other electronic device) monitors the user's U data in real time and provides for automated scheduling, alerting and reporting, for example, so that the user U is automatically directed to a new location once the previous location has been completed, and for example so that customers can be automatically alerted as to when the user U is estimated to arrive at their location. According to some example embodiments, once the user U has completed a job at a location and the data is processed by the electronic device D (or uploaded to the database 300), a job completion report is automatically generated and sent to the customer that is associated with the particular location of the completed job. In example embodiments, the job completion report may include information relating to what fluids were applied (e.g., herbicide, brand, etc.), the location where the fluids were applied, the quantity of fluids applied, the date and time that the fluids were applied, or other desired information.

According to some example embodiments, the software or application of the electronic device D can dispense data therefrom as desired. In some example embodiments, an administrator has the ability to access the data in real time remotely, for example, by accessing the database 300 according to one example embodiment. Preferably, the software of the electronic device D open and/or close work orders, for example, work orders that may or may not be on a predetermined schedule or route. According to example embodiments, the database 300 comprises an employee portal and a customer portal. In example embodiments, the employee portal may comprise an schedule with work orders, a time estimation for each work order, a list of contact information for each of the customers, a history of archive of previously-completed work orders for all customers or specific customers of a particular list of work orders, a real time estimation of the quantity of fluid used and on hand, and/or any other desired information.

FIG. 12 shows a flow chart of a spraying apparatus 400 according to an example embodiment of the present invention. According to example embodiments, the intelligent metering device 10 (identified as MC) is connected to an electronic device D comprising at least a GPS 402, an application 408, software 410 that is capable of collecting data (e.g., data collection 412), and connected to a network 404, for example, such that a data storage network or database 414 compiles any data sent from the intelligent metering device D and received by the electronic device D. In example embodiments, the data storage network or database 414 can comprise an administrator accessible side 420 and a customer accessible side 440. Preferably, various desirable functions can be provided in either of the administrator/customer access points so as to provide a desired functionality to the spraying apparatuses of the present invention. According to one example embodiment, the administrator access side comprises separate access points or functions such as employees, schedule, routes, account locations, access MC (e.g., the intelligent metering component 10), account or work order directions and/or spray routine, send message to MC, update software, etc. The customer access side comprises separate access points or functions such as treatment history, treatment specifics, next scheduled treatment, photo library, my documents, data collected treatment, miscellaneous, contact service provider, employee or administrator, etc. Preferably, one or more additional access points or functions can be provided in the administrator or customer access portals as desired.

FIGS. 13-14 show flow charts of spraying apparatuses 500, 600 according to additional example embodiments of the present invention. For example, according to some example embodiments, the spraying apparatuses 500, 600 (and intelligent metering devices 10 connected therewith) are used in wildlife conservation areas, for example, where additional rules and regulations may be strictly enforced. According to example embodiments, the intelligent metering devices 10 are connected with respective electronic device D. The software or other applications of the electronic devices D utilize their location, for example, to determine if the location corresponds to a conservation area. As such, entering a conservation area or protected area (502, 602) causes the electronic devices D to communicate with the intelligent metering devices 10 and cause the same to lock or prevent fluid from flowing therethrough (504, 604). According to one example embodiment, when in the protected area and with the device 10 locked, certain invasive plants may still need to be treated, and thus, after an invasive plant is identified (506), the user having administrator access can override the locked device 10 (508) and set a geofence (510) corresponding to the area where the invasive plants are located (510), Thereafter, the device 10 can be unlocked (manually or automatically) (512) and will permit fluid to flow therethrough. The invasive plant can then be treated (514) and a photo or image of the invasive plant can be captured (516) for records and/or reporting. For example, according to some example embodiments, the setting of a geofence preferably causes the electronic device D to communicate with the device 10 such that the device 10 is unlocked and functional within the bounds of the geofence but becomes locked once the electronic device D and/or device 10 is located outside of the previously-set geofence. According to the spraying apparatus 600 of FIG. 14, once the invasive plant is identified (606), a photo or image of the invasive plant is captured (608) and sent to an administrator or other agency (e.g., EPA) for approval (610) such that the user can treat accordingly. Once the images are approved by the administrator (612), the administrator can connect to the electronic device D (and/or device 10) remotely and override the system (614) to unlock the device 10 (616) and allow the user to treat the invasive plant (618).

Figure 15:
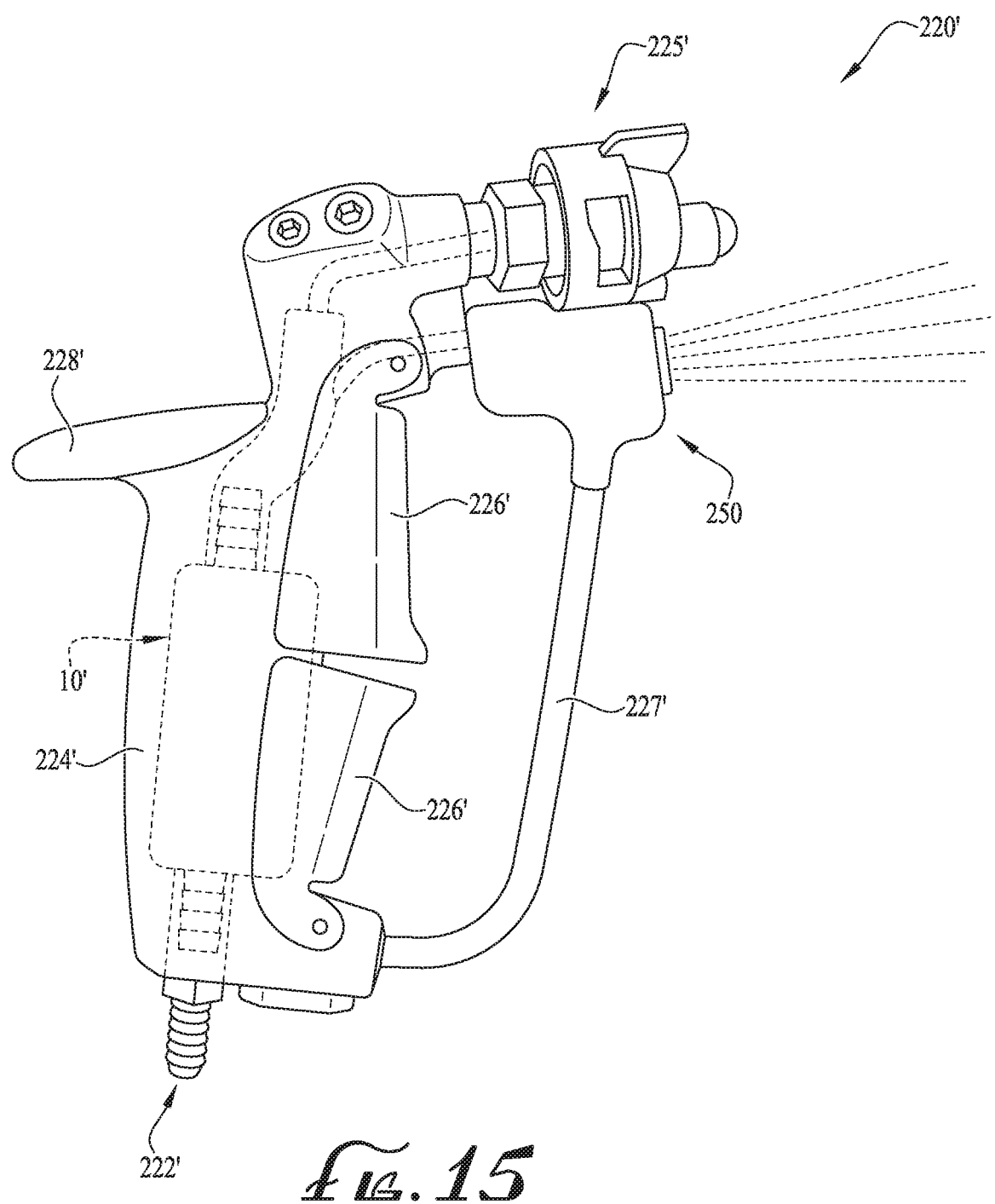
FIG. 15 shows a side view of spray gun for attachment and use with a spraying apparatus according to another example embodiment of the present invention, the spray gun having an intelligent metering system and imaging component incorporated therein.

FIG. 15 shows a spray gun 220' according to another example embodiment of the present invention. In example embodiment, the spray gun 220 is generally similar to the spray gun 220 as described above, for example comprising an input coupling or conduit 222' at an end of a housing or grip portion 224'. Two pivotable triggers 226' are provided on an inside portion of the grip portion 224' so as to allow an operator to grip the grasping portion 224' and force the triggers 226' to actuate so as to permit flow of the liquid from the nozzle assembly 225'. A hand guard 227' and/or an upper flange 228' can be provided so as to support the usability and ergonomics of the spray gun 220. According to example embodiments, one or more electronic components can be incorporated in the spray gun 220, or for example, connected therewith in some fashion so as to capture additional data beyond the data gathered with respect to the intelligent monitoring component 10 (e.g., flow rate, quantity of liquid dispensed, location tracking of dispensed liquid). According to one example embodiment, an intelligent metering component 10' can be housed within the spray gun 220', or for example, the intelligent metering device 10' is integral with the spray gun 220'.

According to another example embodiment, one or more additional components can be provided so as to provide a tracking and comparability functionality, for example, by collecting one or more photographic images of the intended-to-be-sprayed subject (e.g., weeds and invasive brush according to one example) prior and/or during the spraying of the liquid or fluid. For example, according to example embodiments a camera or imaging component 250 can be integrated with or removably mounted to the spray gun 220'. According to example embodiments, the location for each image captured is logged and associated with the specific image. According to one example embodiment, a map can be generated so as to provide a realistic three dimensional map of the landscape and the intended-to-be-sprayed subject prior to and during the dispensing of the liquid on the same. This way, after a period of time to when the liquid is usually effective and noticeable with respect to the health of the intended-to-be-sprayed subject, a user, employee and/or customer can go reassess the area that was previously sprayed and compare to the map that was previously generated. Thus, according to example embodiments, the effectiveness of the spraying application can be visualized, and for example, the user U or other operator maintains accountability of their spraying application based on the before/after images.

In example embodiments, the on-board intelligent metering component 10' can be connected (wired or wireless) with the camera 250. According to some example embodiments, the images captured by the camera 250 are collected in real time and assigned with the real time data obtained from the intelligent metering device 10', for example such that a single line of communication is provided between the intelligent metering component 10' and electronic device D, and thus, data sent from the intelligent metering component 10' to the electronic device D includes data relating to the fluid flowing therethrough and associated images, GPS location, etc.

According to example embodiments, for example, as briefly described above, the intelligent metering component 10 preferably comprises at least one component for measuring (e.g., continuously) the temperature of the fluid passing through the conduit 40 and metering assembly 80 thereof. According to example embodiments, the thermistor 132 comprises a NTC self-adhering temperature sensor that is configured to be secured to the interior wall section 46 of the housing 20. according to other example embodiments, preferably one or more separate sensors and/or components are placed or secured in other areas/locations of the particular spraying device(s). According to one example embodiment, at least one temperature sensor can be provided in the reservoir or fluid containment area of the device, for example, wherein a large quantity or supply of liquid is contained for being dispensed from one or more nozzles of the device. In example embodiments, at least one or more additional sensors can be provided along one or more conduit or hose sections or supply lines, for example, that are generally provided for transporting fluid from the reservoir to the one or more nozzles, or for example, for rerouting fluids between reservoirs, junctions, connectors, or other conduit sections that are fluidly connected with the device. In example embodiments, the one or more sensors can be powered and wirelessly communicate with the electronic device D or other electronic component. According to some example embodiments, one or more of the sensors can be connected with a user interface, the electronic device or otherwise configured to at least partially comprise a wired system. According to another example embodiment, at least one sensor is wired to a processor or other module or device or system, and for example, at least one sensor is wirelessly connected with the processor, module or device or system.

According to example embodiments and as described above, the risk of volatilization, spray drift and off-target movement can be substantially high depending on the environmental conditions where the liquid or fluid (e.g., herbicide, pesticide, etc.) is being applied. For example, volatilization is the conversion of a substance from a liquid or solid to a gas or vapor. All chemicals have a finite vapor pressure and the higher the vapor pressure, the greater the volatility. According to a study conducted, environmental conditions were found to play a large role in how much a herbicide (e.g., dicamba according to one example) will move off the target site in the days following application. According to some examples, greater problems (e.g., high risk of volatilization) can be expected when high temperatures and low relative humidities occur following application. According to some examples, low amounts of rainfall (<0.1 inch) are effective at reducing the potential for volatilization losses. According to one example embodiment, the particular chemical composition of salt used in the different dicamba (e.g., herbicide) products may affect the amount of dicamba likely to leave the target-site. In most cases, the risk of volatilization losses is greatest in the days immediately following application, but under certain conditions it is possible for volatilization to occur several days after application.

According to some example embodiments, under similar environmental and application conditions, the amount of dicamba moving off-target is directly related to the amount applied. Thus, a 0.25 pt application rate of Clarity (e.g., herbicide) would result in a 50% reduction in the amount of dicamba moving off-target compared to a 0.5 pt application. Several of the package mix products containing dicamba (e.g., Celebrity Plus, Distinct, NorthStar) use lower amounts of dicamba than typically applied with Banvel or Clarity. According to example embodiments, lower rates of dicamba in the package mix products have the potential to reduce the potential for off-target movement.

According to one example, a study found that volatilization can occur for up to several days after an application if conditions are suitable. As described above, low relative humidity conditions and high atmospheric temperatures substantially increase the risk of volatilization. According to one study, it was reported that soybean injury due to dicamba volatilization was greater under low humidity conditions (70-75%) than high humidity (85-95%).

According to example embodiments, a temperature inversion can be a severe threat to off-target movement of a herbicide or pesticide. In example embodiments, temperature inversion stops atmospheric convection (which is normally present) from happening in the affected area and can lead to the air becoming stiller and murky from the collection of dust and pollutants that are no longer able to be lifted from the surface. As such, a temperature inversion acts as a cap on the upward movement of air from the layers below. During a temperature inversion, the air temperature increases with increasing height above the soil surface. As such, the coldest, densest air is at the surface and its density steadily decreases with increasing height. The result is a very stable stratification of air that prevents vertical air motion. According to example embodiments, a very stable atmosphere is characterized by low wind speeds and only horizontal, laminar flow. A Texas study has shown that wind speeds of 4-5 mph do not disrupt an inversion because of this inherent stability. For example, when an applicator introduces spray droplets into very stable air, the larger drops with greater fall velocities strike the surface within one to three seconds. However, smaller droplets (about 200 microns in diameter or less) fall as little as a few inches per second and may float along with the air for long distances. Ultimately, the evaporation rate determines how far a droplet can drift. The coolest air near the sprayed surface often is nearly saturated (100 percent relative humidity), so spray droplets will evaporate very slowly. For example, even if the wind speed is between about 1-2 mph, a small droplet can move significant distances, and wind speeds up to 4-5 mph have been measured during temperature inversions.

Thus, according to example embodiments of the present invention, the intelligent metering device 10, 10', in combination with the electronic device D, can be configured to accurately predict the possibility of off-target damage due to the risks associated with volatilization. Preferably, the electronic device D (and/or intelligent metering devices 10, 10') can provide accurate predictions in real time based off of the present available data (e.g., environmental factors, weather, etc.) and the carrier temperatures (e.g., the temperature measured by the thermistor 132). According to example embodiments, the electronic device D can be configured to pull relevant information from one or more other applications or online, for example, such that an automated procedure is constantly, in real time, processing the data to determine the chances of volatilization. According to example embodiments, certain factors to be included when predicting the chances of volatilization include the current and future whether forecast (NOAA, Weather Channel app or website, etc.), wind speeds, atmospheric temperatures, relative humidity, chances of precipitation, temperature inversions, etc. Other factors to consider include the particular chemical that is being applied (e.g., glyphosate, dicamba, 2,4-D, other herbicides, pesticides, pH modifiers, specific label instructions of the chemical), the viscosity of the chemical being applied, the particular mixture ratio, the temperature of the chemical being applied (e.g., as described above re the thermistor 132), the dew point, cloud concentration, visibility, and/or various other factors as desired.

According to one example embodiment, the electronic device D (or database connected therewith) can comprise a library of common chemicals that are typically used for application. Thus, according to example embodiments, the specific label (application instructions, volatility, etc.) of a particular chemical can be easily accessed or processed within the software or application of the electronic device to be used in determining the chances of volatilization at a particular area. According to some example embodiments, the concentrated chemical container can comprise an identifier or barcode, for example, which can be scanned or captured by the electronic device a According to example embodiments, capturing the barcode enters the chemical within the software or application (and/or database accessed over the network) such that the inventory can be tracked and accounted for. Furthermore, capturing the barcode further allows the software to assign a particular chemical from the library to a particular job and/or location, for example, such that the label information and chemical composition of the chemical can be included and accessed to determine the chances of volatilization. With reference back to FIG. 12, the administrator accessible side 420 can include one or more additional administrator access points such as a library of chemicals, a library of barcodes associated with the chemicals, current environmental conditions, weather, carrier temperature, further weather forecast, etc.

For example, according to example embodiments, certain volatile fluids, for example, some herbicides and pesticides, are more volatile at higher temperatures than lower temperatures. In example embodiments, the temperature can include the atmospheric temperature, the soil temperature, and/or the temperature of the fluid (e.g., carrier temperature). According to example embodiments, the process by which the chances of volatilization is determined certainly includes the carrier temperature as a factor. For example, a highly volatile fluid may be extremely volatile at a first temperature whereas a lower volatile fluid may be extremely volatile at a second temperature, for example, where the first temperature is less than the second temperature. Thus, according to example embodiments, the particular volatility of the fluid or chemical, in addition to the temperature of the fluid (measured in real time), the atmospheric temperature, and/or any other environmental factors, conditions; weather forecasts, etc. can be utilized to determine the chances of volatilization of the chemical. According to example embodiments, if the chances of volatilization are at or above a particular threshold, the user or applicator and/or administrator is alerted to cease applying the chemical. In other example embodiments, the intelligent metering device can automatically lock or become disabled due to the chances of volatilization reaching the threshold.

According to additional example embodiments of the present invention, the intelligent metering device 10 (or spray gun 220' with device 10') can be preferably used for a plurality of different applications. According to one example embodiment; a commercial and/or residential lawn care service (e.g., TruGreen®, etc.), pest control service (e.g., Terminix®, Orkin®), and or other application service or business dispensing fluids or liquids, for example, one or more chemicals or other fluids, can incorporate the intelligent metering devices 10, 10' with one or more applicators; sprayers; or other equipment that is typically used. Similarly, the service providers or businesses can utilize the connectability of the metering devices 10, 10' with one or more electronic devices D, wearables SW and/or other electronic devices; databases, servers, etc. so as to quantify the usage of the particular chemical being applied, and for example, have the ability to track the location of where the chemical was applied; and for example, can capture one or more images of the target area that was treated. According to some example embodiments, the location sensing abilities of the intelligent metering devices 10, 10' (and connectable electronic devices D or wearables SW) can provide safety and/or precautionary measures.

According to one example embodiment, one or more geofences are predefined within a map, and for example, an employee attempting to spray or discharge the chemical within an area that is defined within the location of the geofence is prevented from doing so, for example, such that the intelligent metering device locks such that the chemical or fluid is prevented from passing therethrough the conduit. Example locations can include a school, daycare, etc. Thus, according to one example embodiment of the present invention, the metering device can be automatically locked so as to prevent use unless the metering device is linked with the electronic device D and when the electronic device D is in a particular location. According to other example embodiments, the intelligent metering devices of the present invention can be incorporated with one or more spraying apparatuses such as a vehicle equipped with a large reservoir or tank (e.g., for containing the liquid) and one or more spraying nozzles or booms, etc. One example can include large scale equipment such as a tractor and other necessary equipments for treating large areas, crops, etc. Other examples can include a utility truck comprising multiple hoses and reservoirs, for example, a lawn care service vehicle.

While the invention has been described with reference to preferred and example embodiments, it will be understood by those skilled in the art that a variety of modifications, additions and deletions are within the scope of the invention, as defined by the following claims.

What is claimed is:

1. A fluid metering device comprising:
a housing including an isolated fluid conduit integrally formed in the housing;
a metering assembly positioned within the isolated fluid conduit;
an electronics assembly positioned within the housing isolated from the isolated fluid conduit; and
a power assembly positioned within the housing isolated from the isolated fluid conduit.

2. The fluid metering device of claim 1, wherein the metering assembly comprises a turbine rotationally mounted within the fluid conduit.

3. The fluid metering device of claim 2, wherein the turbine comprises a pair of oppositely-positioned magnetic elements embedded therein.

4. The fluid metering device of claim 1, wherein the electronics assembly comprises a PCB board, a microprocessor, a Hall Effect sensor, a thermistor, and a Bluetooth component.

5. The fluid metering device of claim 4, wherein the Hall Effect sensor is positioned in close proximity to the turbine so as to sense a change in the magnetic field as the turbine rotates and provide a count related to the rotations thereof.

6. The fluid metering device of claim 5, wherein the count of rotations sensed by the Hall Effect sensor is processed by the microprocessor in real time, and wherein a time stamp is provided for each count such that the flow rate and quantity of a fluid passing through the fluid conduit and causing rotation of the turbine can be determined.

7. The fluid metering device of claim 6, wherein an electronic device is connectable with the electronics assembly such that the count of turbine rotations and time stamp data from the microprocessor can be received and processed, and calculations can determine the flow rate and quantity of fluid that passed through the metering assembly.

8. The fluid metering device of claim 4, wherein the temperature of the fluid can be measured and collected in real time as it passes through the fluid conduit, wherein the thermistor is secured within a portion of the housing and nearby the fluid conduit.

9. The fluid metering device of claim 4, further comprising a GPS and/or cellular component for attachment to the PCB board, the GPS component capable of obtaining the location of the fluid metering component and the cellular component connectable with one or more cellular networks such that data received by the microprocessor can be further sent in real time to a database or cloud server in a remote location.

10. A spraying apparatus comprising the fluid metering device of claim 1.

11. The spraying apparatus of claim 10, further comprising an electronic device for wirelessly connecting with the fluid metering device such that data collected from the fluid metering device is sent to the electronic device in real time.

12. The spraying apparatus of claim 11, wherein the electronic device comprises software or an application for determining the chances of volatilization of the fluid that is to be dispensed from the spray apparatus, the software or application calculating the chances of volatilization based on factors including the temperature of the fluid, the atmospheric temperature, wind speeds, humidity and chances of precipitation.

13. A fluid metering device comprising:
a housing;
an isolated fluid conduit formed in the housing and including an inlet and an outlet;
a metering assembly including a turbine with one or more pitched veins positioned perpendicular to a flow direction defined between the inlet and the outlet;
an electronics assembly positioned within the housing and configured to receive data from the metering assembly; and
a power assembly positioned within the housing and configured to provide power to the electronics assembly.

14. The fluid metering device of claim 13, wherein the turbine includes a pair of oppositely-positioned magnetic elements embedded therein.

15. The fluid metering device of claim 14, wherein the electronics assembly includes a PCB board, a microprocessor, a Hall Effect sensor, and further wherein the Hall Effect sensor is positioned in close proximity to the turbine so as to sense a change in the magnetic field as the turbine rotates and provide a count related to the rotations thereof.

16. The fluid metering device of claim 15, wherein the count of rotations sensed by the Hall Effect sensor is processed by the microprocessor in real time, and wherein a time stamp is provided for each count such that the flow rate and quantity of a fluid passing through the fluid conduit and causing rotation of the turbine can be determined.

17. A fluid metering apparatus comprising:
a housing including an isolated fluid conduit defined in the housing and at least one compartment defined in the housing separate from the isolated fluid conduit;
a metering assembly positioned within the isolated fluid conduit;
an electronics assembly positioned within the at least one compartment of the housing; and
a power assembly positioned within the at least one compartment of the housing.

18. The fluid metering apparatus of claim 17, wherein:
the electronics assembly and the power assembly are positioned within different compartments of the at least one compartment of the housing.

19. The fluid metering apparatus of claim 17, wherein:
the at least compartment of the housing includes an internal cavity and a reservoir;
the electronic assembly is positioned within the internal cavity of the housing; and
the power assembly is positioned within the reservoir of the housing.

20. The fluid metering apparatus of claim 19, wherein the internal cavity is accessible via a lid of the housing, and further wherein the reservoir is accessible via a cap of the housing.

* * * * *